3,597,245
PHOSPHATE OPTICAL GLASS WITH POSITIVE ANOMALOUS PARTIAL DISPERSION
Heinz Bromer, Hermannstein, Kreis Wetzlar, and Norbert Meinert and Johann Spincic, Wetzlar, Germany, assignors to Ernst Leitz G.m.b.H., Wetzlar, Germany
No Drawing. Continuation of application Ser. No. 768,915, Oct. 18, 1968. This application May 12, 1970, Ser. No. 37,414
Claims priority, application Germany, Oct. 28, 1967, P 15 96 888.4
Int. Cl. C03c 3/00
U.S. Cl. 106—47Q
6 Claims

ABSTRACT OF THE DISCLOSURE

Novel optical glasses are disclosed which possess a positive anomalous partial dispersion and which are resistant to chemical influences, for example from the atmosphere, to such a degree that lenses manufactured from these glasses can be employed as front lenses in optical systems, such as photographic objectives, According to the invention the glasses are melted from a batch composition consisting essentially of:

5–20% by weight of the metaphosphates of the alkaline elements; 50–75% by weight of a constituent selected from a group consisting of the metaphosphates of the alkaline earth elements magnesium, calcium, strontium and barium; 2–15% by weight of titanium dioxide; and 2–15% of the oxide of beryllium.

CROSS-REFERENCE TO RELATED APPLICATIONS

This is a continuation of copending application, Ser. No. 768,915, filed Oct. 18, 1968, and now abandoned.

Reference is made to copending application Ser. No. 542,035, filed Apr. 12, 1966, now Pat. No. 3,451,829 by two of the three inventors of the present invention and assigned to the same assignee.

BACKGROUND OF THE INVENTION (1) Field of the invention

The present invention pertains to glass, more particularly to optical glasses having anomalous partial dispersion.

(2) Description of the prior art

Optical glasses having anomalous partial dispersion are well known to those skilled in the art of melting glass and also to the designers of lenses and optical systems.

For the lens designer these glasses are particularly important if objectives with a corrected secondary spectrum are to be calculated. In patent application Ser. No. 542,035 the employment of such glasses is disclosed in more detail. The patent application referred to relates particularly to glasses having a positive deviation of the partial dispersion —which is usually designated by the $\Delta_v$ value—from the curve for normal glasses in the $\mathcal{S'}_g v_e$-diagram.

The glasses disclosed in application Ser. No. 542,035 consist of the phosphates of aluminum and of the phosphates of the alkaline earth elements as the glass former. Additionally, they contain alkaline oxides and oxides of bivalent elements and, further, they may contain titanium dioxide of which it is known that it contributes essentially to a positive deviation of the partial dispersion.

As mentioned before, these known glasses possess properties with regard to their anomalous partial dispersion which are most valuable for the designer of lens systems, objectives etc. However, owing to their sensitivity towards chemical and atmospherical influences they are not fit to be used as the front or rear lens in such a system.

SUMMARY OF THE INVENTION

It is, therefore, the object of the invention to provide optical glasses also having a positive anomalous partial dispersion, just as have the glasses disclosed in application Ser No. 542,035, which inventive glasses, however, are resistant to chemical influences to such a degree that lenses manufactured therefrom can be employed as the front or rear lens in any lens system.

According to the invention these glasses are melted from a batch composition consisting of:

5–20 mole percent of the metaphosphates of the alkaline elements; 50–75% by weight of the metaphosphates of the alkaline earth elements magnesium, calcium, strontium and/or barium; 2–15% by weight of titanium dioxide; and 2–15% of the oxide of beryllium.

The foregoing composition can also be defined by the mole percentage, in which case the percentage would be as follows:

6–20 mole percent of the metaphosphates of the alkaline elements;
25–27 mole percent of the metaphosphates of the alkaline earth elements magnesium, calcium, strontium and/or barium;
3–20 mole percent of titanium dioxide; and
10–50 mole percent of the oxide of beryllium.

For adjusting the optical values the oxides of the alkaline earth elements magnesium, calcium, strontium and barium can be used. In order to achieve proper decolorization as well as to render the batch composition easy to melt the arsenate of potassium ($KAsO_3$) and/or the fluorotitanate of potassium ($K_2TiF_6$) can be added.

The improvement of the chemical resistance of the glasses is largely due to the oxide of beryllium which is included in the batch composition. This constituent is generally considered undesirable in a batch composition owing to its poisonous nature. However, it has been found that beryllium oxide can be handled safely if adequate precautions are taken and certain safety measures are observed. Such safety measures should, for example, include an exhauster at the working place and dust face shields for the men mixing the batch composition. During the melting process the beryllium is transformed to other chemical compounds, thereby losing its toxicity.

DESCRIPTION OF THE APPENDING TABLES

In the following tables are listed several examples for glasses according to the invention. More particularly, Table 1 includes examples wherein by variation of the percentage of metaphosphate or by variation of the percentage of the oxide of barium in the batch composition a variation of the refractive index ($n$) and the partial dispersion values ($\Delta v$) has been achieved, while the dispersion of value ($v$) remains unchanged.

Table 2 includes examples wherein the percentage of the oxide of beryllium has been lowered while the percentage of titanium dioxide has been increased. Here, it is readily discernible that corresponding to the reduced percentage of titanium dioxide also the $\Delta v$ values decrease. On the other hand, it is this way easily possible to achieve major variations with regard to the refractive indices ($n$) and the dispersion values ($v$).

In Table 3 are listed glasses which possess equal $\Delta v$ values which glasses, however, show variations of the refractive index ($n$) and of the dispersion values ($v$). This being the result of an increase in percentage of the oxide of barium, while, at the same time, the percentage of the oxide of beryllium was reduced.

DESCRIPTION OF THE MELTING OF A 50 g. BATCH COMPOSITION

The well-mixed batch is in portions put into the crucible at a temperature of 1400° C. Thereafter, the batch is melted for 40 minutes and is then cast into steel molds or into non-ferrous molds pre-heated to 450° C.

TABLE 1

| Batch composition No. | 1 | 2 | 3 | 4 | 5 | 6 | 7 | 8 | 9 | 10 |
|---|---|---|---|---|---|---|---|---|---|---|
| $LiPO_3$: | | | | | | | | | | |
| Weight percent | 7.4 | 7.4 | 7.4 | 7.4 | 7.4 | 7.4 | 7.4 | 7.4 | 7.4 | 7.4 |
| Mole percent | 8.48 | 8.5 | 8.5 | 8.7 | 8.6 | 8.7 | 8.8 | 8.4 | 18.6 | 8.9 |
| $KPO_3$: | | | | | | | | | | |
| Weight percent | 10.0 | 7.0 | 4.0 | | 5.0 | | | 10.0 | 5.0 | |
| Mole percent | 8.37 | 5.8 | 3.5 | | 4.2 | | | 8.3 | 4.2 | |
| $\Sigma MePO_3$: | | | | | | | | | | |
| Weight percent | 17.4 | 14.4 | 11.4 | 7.4 | 12.4 | 7.4 | 7.4 | 17.4 | 12.4 | 7.4 |
| Mole percent | 16.85 | 14.3 | 12.0 | 8.7 | 12.8 | 8.7 | 8.8 | 16.7 | 12.8 | 8.9 |
| $Mg(PO_3)_2$: | | | | | | | | | | |
| Weight percent | 50.0 | 50.0 | 50.0 | 50.0 | 50.0 | 50.0 | 60.0 | 50.0 | 50.0 | 50.0 |
| Mole percent | 27.2 | 27.2 | 27.4 | 27.6 | 27.7 | 27.9 | 33.6 | 26.6 | 27.8 | 28.7 |
| $Ca(PO_3)_2$: | | | | | | | | | | |
| Weight percent | 14.6 | 14.6 | 14.6 | 14.6 | 19.6 | 24.6 | 14.6 | 4.6 | 14.6 | 14.6 |
| Mole percent | 7.3 | 7.4 | 7.4 | 7.5 | 10.0 | 12.5 | 7.5 | 2.2 | 7.5 | 7.7 |
| $Ba(PO_3)_2$: | | | | | | | | | | |
| Weight percent | | | | | | | | | 5.0 | 10.0 |
| Mole percent | | | | | | | | | 1.6 | 3.5 |
| $\Sigma Me(PO_3)_2$: | | | | | | | | | | |
| Weight percent | 64.6 | 64.6 | 64.6 | 64.6 | 69.6 | 74.6 | 74.6 | 54.6 | 69.6 | 74.6 |
| Mole percent | 34.5 | 34.6 | 34.8 | 35.1 | 37.7 | 40.4 | 41.1 | 28.8 | 36.9 | 39.9 |
| $TiO_2$: | | | | | | | | | | |
| Weight percent | 7.0 | 7.0 | 7.0 | 7.0 | 7.0 | 7.0 | 7.0 | 7.0 | 7.0 | 7.0 |
| Mole percent | 8.65 | 8.7 | 8.7 | 8.8 | 8.7 | 8.8 | 8.9 | 8.5 | 8.7 | 9.0 |
| BeO: | | | | | | | | | | |
| Weight percent | 10.0 | 10.0 | 10.0 | 10.0 | 10.0 | 10.0 | 10.0 | 10.0 | 10.0 | 10.0 |
| Mole percent | 39.4 | 39.8 | 40.0 | 40.3 | 40.2 | 41.5 | 40.6 | 39.0 | 41.0 | 41.6 |
| BaO: | | | | | | | | | | |
| Weight percent | | 3.0 | 6.0 | 10.0 | | | | 10.0 | | |
| Mole percent | | 2.0 | 3.9 | 6.5 | | | | 6.4 | | |
| $KAsO_3$: | | | | | | | | | | |
| Weight percent | 1.0 | 1.0 | 1.0 | 1.0 | 1.0 | 1.0 | 1.0 | 1.0 | 1.0 | 1.0 |
| Mole percent | 0.6 | 0.6 | 0.6 | 0.6 | 0.6 | 0.6 | 0.6 | 0.6 | 0.6 | 0.6 |
| $n_e$ | 1.5993 | 1.6060 | 1.6127 | 1.6226 | 1.6193 | 1.6094 | 1.6058 | 1.6071 | 1.6064 | 1.6115 |
| $v_e$ | 44.5 | 44.6 | 44.7 | 44.8 | 44.5 | 44.5 | 44.7 | 45.4 | 44.2 | 44.1 |
| $\vartheta'_g \times 10^4$ | 5160 | 5154 | 5146 | 5158 | | 5132 | 5250 | 5202 | 5113 | 5137 |
| $\Delta v_e$ | +8.6 | +8.3 | +7.8 | +8.7 | | +6.4 | +15.1 | +12.4 | +5.0 | +6.6 |

TABLE 2

| Batch composition No. | 11 | 12 | 13 | 14 | 15 |
|---|---|---|---|---|---|
| $LiPO_3$: | | | | | |
| Weight percent | 7.4 | 7.4 | 7.4 | 7.4 | 7.4 |
| Mole percent | 10.1 | 9.5 | 9.0 | 8.1 | 7.7 |
| $KPO_3$: | | | | | |
| Weight percent | 10.0 | 10.0 | 10.0 | 10.0 | 10.0 |
| Mole percent | 10.0 | 9.4 | 8.9 | 8.0 | 7.5 |
| $\Sigma MePO_3$: | | | | | |
| Weight percent | 17.4 | 17.4 | 17.4 | 17.4 | 17.4 |
| Mole percent | 20.1 | 18.9 | 17.9 | 16.1 | 15.2 |
| $Mg(PO_3)_2$: | | | | | |
| Weight percent | 50.0 | 50.0 | 50.0 | 50.0 | 50.0 |
| Mole percent | 32.4 | 30.4 | 28.6 | 25.6 | 24.4 |
| $Ca(PO_3)_2$: | | | | | |
| Weight percent | 14.6 | 14.6 | 14.6 | 14.6 | 14.6 |
| Mole percent | 8.7 | 8.2 | 7.8 | 6.9 | 6.6 |
| $\Sigma Me(PO_3)_2$: | | | | | |
| Weight percent | 64.6 | 64.6 | 64.6 | 64.6 | 64.6 |
| Mole percent | 41.1 | 38.6 | 36.4 | 32.5 | 31.0 |
| $TiO_2$: | | | | | |
| Weight percent | 13.0 | 11.0 | 9.0 | 5.0 | 3.0 |
| Mole percent | 19.2 | 15.3 | 11.7 | 5.8 | 3.3 |
| BeO: | | | | | |
| Weight percent | 4.0 | 6.0 | 8.0 | 12.0 | 14.0 |
| Mole percent | 18.9 | 26.5 | 33.4 | 45.0 | 50.0 |
| $KAsO_3$: | | | | | |
| Weight percent | 1.0 | 1.0 | 1.0 | 1.0 | 1.0 |
| Mole percent | 0.7 | 0.7 | 0.6 | 0.6 | 0.5 |
| $n_e$ | 1.6406 | 1.6262 | 1.6119 | 1.5893 | 1.5744 |
| $v_e$ | 33.6 | 36.7 | 40.4 | 48.1 | 55.6 |
| $\Theta_g \times 10^4$ | 5,357 | 5,320 | 5,188 | 5,082 | 4,966 |
| $\Delta v_e$ | +11.6 | +12.0 | +6.5 | +4.1 | +6.0 |

TABLE 3

| Batch composition No. | 16 | 17 | 18 | 19 |
|---|---|---|---|---|
| $LiPO_3$: | | | | |
| Weight percent | 8.2 | 8.2 | 8.2 | 8.2 |
| Mole percent | 9.6 | 10.7 | 12.1 | 13.7 |
| $KPO_3$: | | | | |
| Weight percent | | | | |
| Mole percent | | | | |
| $\Sigma MePO_3$: | | | | |
| Weight percent | 8.2 | 8.2 | 8.2 | 8.2 |
| Mole percent | 9.6 | 10.7 | 12.1 | 13.7 |
| $Mg(PO_3)_2$: | | | | |
| Weight percent | 54.8 | 54.8 | 54.8 | 54.8 |
| Mole percent | 30.4 | 33.6 | 38.1 | 44.0 |
| $Ca(PO_3)_2$: | | | | |
| Weight percent | 16.2 | 16.2 | 16.2 | 16.2 |
| Mole percent | 8.3 | 9.2 | 10.4 | 11.9 |
| $\Sigma Me(PO_3)_2$: | | | | |
| Weight percent | 71.0 | 71.0 | 71.0 | 71.0 |
| Mole percent | 38.7 | 42.8 | 48.5 | 55.9 |
| $TiO_2$: | | | | |
| Weight percent | 2.9 | 2.9 | 2.9 | 2.9 |
| Mole percent | 3.6 | 4.0 | 4.6 | 5.2 |
| BeO: | | | | |
| Weight percent | 11.1 | 8.1 | 5.1 | 2.1 |
| Mole percent | 45.0 | 36.7 | 25.9 | 12.2 |
| BaO: | | | | |
| Weight percent | | 3.0 | 6.0 | 9.0 |
| Mole percent | | 2.3 | 5.0 | 8.5 |
| $KAsO_3$: | | | | |
| Weight percent | 1.1 | 1.1 | 1.1 | 1.1 |
| Mole percent | 0.7 | 0.8 | 0.9 | 1.0 |
| $K_2TiF_6$: | | | | |
| Weight percent | 5.7 | 5.7 | 5.7 | 5.7 |
| Mole percent | 2.4 | 2.7 | 3.0 | 3.5 |
| $e v_e$ | 1.5779 | 1.5871 | 1.5908 | 1.5907 |
| $\Theta$ | 54.2 | 48.7 | 46.8 | 47.6 |
| $\Delta'_g \times 10^4$ | 4,986 | 5,100 | 5,127 | 5,117 |
| $nv_e$ | +6.1 | +8.6 | +8.6 | +8.7 |

We claim:
1. Glass for optical purposes having positive anomalous partial dispersion between about 4.1–15.1 $\Delta v_e$ which glass is melted from a batch composition consisting essentially of about:
7.4–17.4% by weight of the metaphosphates of alkaline elements,
54.6–74.6% by weight of a constituent selected from a group consisting of the metaphosphates of the alkaline earth elements magnesium, calcium and barium,
2.9–13% by weight of the oxide of titanium, and
2.1–14% by weight of the oxide of beryllium.

2. Glass according to claim 1, wherein the batch composition from which said glass is melted consists additionally of up to 7% by weight of a constituent selected from a group consisting of the arsenate of potassium ($KAsO_3$) and the fluorotitanate of potassium ($K_2TiF_6$).

3. Glass as defined in claim 1, wherein the batch composition from which said glass is melted consists additionally of up to 10% by weight of the oxide of barium.

4. Glass according to claim 3, wherein the batch composition from which said glass is melted consists essentially of the following constituents:

| Constituent | Weight percent |
|---|---|
| $LiPO_3$ | 7.4–8.2 |
| $KPO_3$ | 0–10 |
| (with the total of $MePO_3$ ranging betweeen 7.4–17.4%) | |
| $Mg(PO_3)_2$ | 50–60 |
| $Ca(PO_3)_2$ | 4.6–24.6 |
| $Ba(PO_3)_2$ | 0–10 |
| (with the total of $Me(PO_3)_2$ ranging between 54.6–74.6%) | |
| $TiO_2$ | 2.4–13 |
| BeO | 2.1–14 |
| BaO | 0–10 |
| (with the total of MeO ranging between 14–27%) | |
| $KAsO_3$ | 1.0–1.1 |
| $K_2TiF_6$ | 0–6 |

5. Glass as defined in claim 3, wherein the batch composition from which said glass is melted consists of about 3.0–10.0% by weight of the oxide of barium.

6. Glass as defined in claim 2, wherein said arsenate of potassium is about 1.0–1.1% by weight and said fluorotitanate of potassium is about 5.7% by weight.

References Cited

UNITED STATES PATENTS

| | | | |
|---|---|---|---|
| 2,423,128 | 7/1947 | Tillyer | 106—47Q |
| 2,577,627 | 12/1951 | Pincus | 106—47R |
| 2,996,390 | 8/1961 | Weissenberg et al. | 106—47R |
| 3,068,108 | 12/1962 | Geffcken | 106—47R |
| 3,100,714 | 8/1963 | Bromer et al. | 106—54 |

FOREIGN PATENTS

| | | | |
|---|---|---|---|
| 1,003,926 | 3/1957 | Germany | 106—47R |

OTHER REFERENCES

Vol. f, M.B.: Technical Glasses; London, 1961, pp. 410–412.

Vol. b, M.B.: Technical Glasses; London, 1961, pp. 410–412.

HELEN M. McCARTHY, Primary Examiner

W. R. SATTERFIELD, Assistant Examiner